United States Patent
Dageville et al.

(10) Patent No.: US 12,210,527 B2
(45) Date of Patent: Jan. 28, 2025

(54) ACTIVE INVALIDATION OF METADATA CACHE ENTRIES

(71) Applicant: Snowflake Inc., Bozeman, MT (US)

(72) Inventors: Benoit Dageville, San Mateo, CA (US); Lyuping Du, Issaquah, WA (US); Martin Hentschel, Berlin (DE); Elkhan Mammedov, Berlin (DE); Lukas Moll, Berlin (DE); Vikram Wakade, Sammamish, WA (US)

(73) Assignee: Snowflake Inc., Bozeman, MT (US)

( * ) Notice: Subject to any disclaimer, the term of this patent is extended or adjusted under 35 U.S.C. 154(b) by 0 days.

(21) Appl. No.: 18/128,152

(22) Filed: Mar. 29, 2023

(65) Prior Publication Data

US 2024/0330296 A1    Oct. 3, 2024

(51) Int. Cl.
  *G06F 7/00*      (2006.01)
  *G06F 16/23*     (2019.01)
  *G06F 16/2455*   (2019.01)
  *G06F 17/00*     (2019.01)

(52) U.S. Cl.
  CPC .... *G06F 16/24552* (2019.01); *G06F 16/2358* (2019.01); *G06F 16/2365* (2019.01)

(58) Field of Classification Search
  None
  See application file for complete search history.

(56) References Cited

U.S. PATENT DOCUMENTS

2015/0379060 A1* 12/2015 Levandoski ........ G06F 16/2322
                                                     707/607
2016/0110403 A1*  4/2016 Lomet ................ G06F 16/2255
                                                     707/695
2022/0318223 A1* 10/2022 Ahluwalia .......... G06F 16/2219

* cited by examiner

*Primary Examiner* — Tuan A Pham
(74) *Attorney, Agent, or Firm* — Schwegman Lundberg & Woessner, P.A.

(57) ABSTRACT

Techniques for active invalidation of cache entries are described. A first timestamp and a second timestamp are stored by a compute instance, the first timestamp corresponding to an initial time the computing instance read from a version update log in a database and the second timestamp corresponding to a last time the computing instance read from the version update log in the database. The compute instance can read records from the version update log that are associated with version timestamps greater than the second timestamp. The compute instance can invalidate a first set of cache entries with older versions stored in a cache based on reading the records, retaining a second set of cache entries, and then execute a query using the second set of cache entries.

12 Claims, 10 Drawing Sheets

ACTIVE INVALIDATION OF METADATA CACHE ENTRIES

TECHNICAL FIELD

The present disclosure generally relates to data systems, and, more specifically, cache systems in use with databases.

BACKGROUND

As the world becomes more data driven, database systems and other data systems are storing more and more data. Data systems often employ caches to improve performance speed. However, data in caches can get stale. Therefore, data in a cache is validated to ensure that the data is still up to date during query processing. To validate the data is still up to date, the computing resource with the cache often compares the version of the data in the cache with the version of the data at the source location, such as a database. If both versions are equal, the cache entry can be used. If versions differ instead, the cache entry is discarded and reloaded from the source location. Validation therefore can require a lookup in the source location for every cache read, which can lead to deteriorating performance issues.

BRIEF DESCRIPTION OF THE DRAWINGS

Various ones of the appended drawings merely illustrate example embodiments of the present disclosure and should not be considered as limiting its scope.

DETAILED DESCRIPTION

Techniques for active invalidation of cache entries are described. The techniques described herein can eliminate the point lookups for each cache entry in certain scenarios. For database systems, this improves performance of query compilation because there are less reads to the source database that are performed during query setup and query compilation. Therefore, these techniques improve performance of query setup and query compilation because they improve end-to-end runtime of queries.

The techniques described herein can use timestamps to record when a compute instance reads from a version update log in a database. A START timestamp can correspond to an initial time the compute instance read from the version update log, and an END timestamp can correspond to a last time the compute instance read from the version update log. The compute instance, when triggered, can read the latest records from the version update log based on the END timestamp. The compute instance can actively invalidate stale cache entries from its cache based on the latest records from the version update log. Therefore, the compute instance can then execute a query using the remaining cache entries in the cache without having to validating those cache entries against the database.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Figure 1:
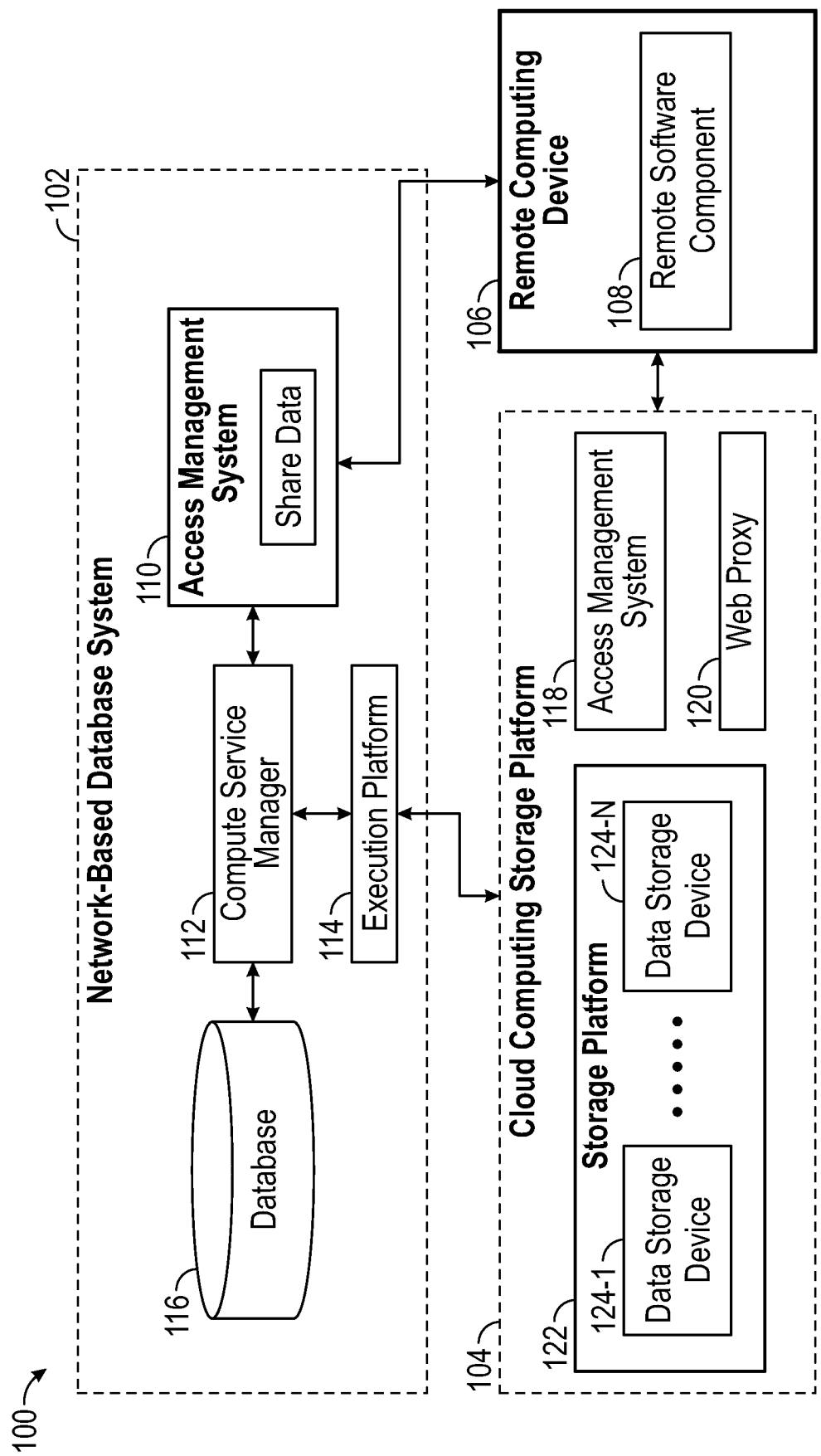
FIG. 1 illustrates an example computing environment, according to some example embodiments.

FIG. 1 illustrates an example shared data processing platform 100. To avoid obscuring the inventive subject matter with unnecessary detail, various functional components that are not germane to conveying an understanding of the inventive subject matter have been omitted from the figures. However, a skilled artisan will readily recognize that various additional functional components may be included as part of the shared data processing platform 100 to facilitate additional functionality that is not specifically described herein.

As shown, the shared data processing platform 100 comprises the network-based database system 102, a cloud computing storage platform 104 (e.g., a storage platform, an AWS® service, Microsoft Azure®, or Google Cloud Services®), and a remote computing device 106. The network-based database system 102 is a cloud database system used for storing and accessing data (e.g., internally storing data, accessing external remotely located data) in an integrated manner, and reporting and analysis of the integrated data from the one or more disparate sources (e.g., the cloud computing storage platform 104). The cloud computing storage platform 104 comprises a plurality of computing machines and provides on-demand computer system resources such as data storage and computing power to the network-based database system 102. While in the embodiment illustrated in FIG. 1, a data warehouse is depicted, other embodiments may include other types of databases or other data processing systems.

The remote computing device 106 (e.g., a user device such as a laptop computer) comprises one or more computing machines (e.g., a user device such as a laptop computer) that execute a remote software component 108 (e.g., browser accessed cloud service) to provide additional functionality to users of the network-based database system 102. The remote software component 108 comprises a set of machine-readable instructions (e.g., code) that, when executed by the remote computing device 106, cause the remote computing device 106 to provide certain functionality. The remote software component 108 may operate on input data and generates result data based on processing, analyzing, or otherwise transforming the input data. As an example, the remote software component 108 can be a data provider or data consumer that enables database tracking procedures, such as streams on shared tables and views, as discussed in further detail below.

The network-based database system 102 comprises an access management system 110, a compute service manager 112, an execution platform (also referred to as XP) 114, and a database 116. The access management system 110 enables administrative users to manage access to resources and services provided by the network-based database system 102. Administrative users can create and manage users, roles, and groups, and use permissions to allow or deny access to resources and services. The access management system 110 can store shared data that securely manages shared access to the storage resources of the cloud computing storage platform 104 amongst different users of the network-based database system 102, as discussed in further detail below.

The compute service manager 112 coordinates and manages operations of the network-based database system 102. The compute service manager 112 also performs query optimization and compilation as well as managing clusters of computing services that provide compute resources (e.g., virtual warehouses, virtual machines, EC2 clusters). The compute service manager 112 can support any number of client accounts such as end users providing data storage and retrieval requests, system administrators managing the systems and methods described herein, and other components/devices that interact with compute service manager 112.

The compute service manager 112 is also coupled to database 116, which is associated with the entirety of data stored on the shared data processing platform 100. The database 116 stores data pertaining to various functions and aspects associated with the network-based database system 102 and its users.

In some embodiments, database 116 includes a summary of data stored in remote data storage systems as well as data available from one or more local caches. Additionally, database 116 may include information regarding how data is organized in the remote data storage systems and the local caches. Database 116 allows systems and services to determine whether a piece of data needs to be accessed without loading or accessing the actual data from a storage device. The compute service manager 112 is further coupled to an execution platform 114, which provides multiple computing resources (e.g., virtual warehouses) that execute various data storage and data retrieval tasks, as discussed in greater detail below.

Execution platform 114 is coupled to multiple data storage devices 124-1 to 124-N that are part of a cloud computing storage platform 104. In some embodiments, data storage devices 124-1 to 124-N are cloud-based storage devices located in one or more geographic locations. For example, data storage devices 124-1 to 124-N may be part of a public cloud infrastructure or a private cloud infrastructure. Data storage devices 124-1 to 124-N may be hard disk drives (HDDs), solid state drives (SSDs), storage clusters, Amazon S3 storage systems or any other data storage technology. Additionally, cloud computing storage platform 104 may include distributed file systems (such as Hadoop Distributed File Systems (HDFS)), object storage systems, and the like.

The execution platform 114 comprises a plurality of compute nodes (e.g., virtual warehouses). A set of processes on a compute node executes a query plan compiled by the compute service manager 112. The set of processes can include: a first process to execute the query plan; a second process to monitor and delete micro-partition files using a least recently used (LRU) policy, and implement an out of memory (OOM) error mitigation process; a third process that extracts health information from process logs and status information to send back to the compute service manager 112; a fourth process to establish communication with the compute service manager 112 after a system boot; and a fifth process to handle all communication with a compute cluster for a given job provided by the compute service manager 112 and to communicate information back to the compute service manager 112 and other compute nodes of the execution platform 114.

The cloud computing storage platform 104 also comprises an access management system 118 and a web proxy 120. As with the access management system 110, the access management system 118 allows users to create and manage users, roles, and groups, and use permissions to allow or deny access to cloud services and resources. The access management system 110 of the network-based database system 102 and the access management system 118 of the cloud computing storage platform 104 can communicate and share information so as to enable access and management of resources and services shared by users of both the network-based database system 102 and the cloud computing storage platform 104. The web proxy 120 handles tasks involved in accepting and processing concurrent API calls, including traffic management, authorization and access control, monitoring, and API version management. The web proxy 120 provides HTTP proxy service for creating, publishing, maintaining, securing, and monitoring APIs (e.g., REST APIs).

In some embodiments, communication links between elements of the shared data processing platform 100 are implemented via one or more data communication networks. These data communication networks may utilize any communication protocol and any type of communication medium. In some embodiments, the data communication networks are a combination of two or more data communication networks (or sub-Networks) coupled to one another. In alternative embodiments, these communication links are implemented using any type of communication medium and any communication protocol.

As shown in FIG. 1, data storage devices 124-1 to 124-N are decoupled from the computing resources associated with the execution platform 114. That is, new virtual warehouses can be created and terminated in the execution platform 114 and additional data storage devices can be created and terminated on the cloud computing storage platform 104 in an independent manner. This architecture supports dynamic changes to the network-based database system 102 based on the changing data storage/retrieval needs as well as the changing needs of the users and systems accessing the shared data processing platform 100. The support of dynamic changes allows network-based database system 102 to scale quickly in response to changing demands on the systems and components within network-based database system 102. The decoupling of the computing resources from the data storage devices 124-1 to 124-N supports the storage of large amounts of data without requiring a corresponding large amount of computing resources. Similarly, this decoupling of resources supports a significant increase in the computing resources utilized at a particular time without requiring a corresponding increase in the available data storage resources. Additionally, the decoupling of resources enables different accounts to handle creating additional compute resources to process data shared by other users without affecting the other users' systems. For instance, a data provider may have three compute resources and share data with a data consumer, and the data consumer may generate new compute resources to execute queries against the shared data, where the new compute resources are managed by the data consumer and do not affect or interact with the compute resources of the data provider.

Compute service manager 112, database 116, execution platform 114, cloud computing storage platform 104, and remote computing device 106 are shown in FIG. 1 as individual components. However, each of compute service manager 112, database 116, execution platform 114, cloud computing storage platform 104, and remote computing environment may be implemented as a distributed system (e.g., distributed across multiple systems/platforms at multiple geographic locations) connected by APIs and access information (e.g., tokens, login data). Additionally, each of compute service manager 112, database 116, execution platform 114, and cloud computing storage platform 104 can be scaled up or down (independently of one another) depending on changes to the requests received and the changing needs of shared data processing platform 100. Thus, in the described embodiments, the network-based database system 102 is dynamic and supports regular changes to meet the current data processing needs.

During typical operation, the network-based database system 102 processes multiple jobs (e.g., queries) determined by the compute service manager 112. These jobs are scheduled and managed by the compute service manager 112 to determine when and how to execute the job. For example, the compute service manager 112 may divide the job into multiple discrete tasks and may determine what data is needed to execute each of the multiple discrete tasks. The compute service manager 112 may assign each of the multiple discrete tasks to one or more nodes of the execution platform 114 to process the task. The compute service manager 112 may determine what data is needed to process a task and further determine which nodes within the execution platform 114 are best suited to process the task. Some nodes may have already cached the data needed to process the task (due to the nodes having recently downloaded the data from the cloud computing storage platform 104 for a previous job) and, therefore, be a good candidate for processing the task. Metadata stored in the database 116 assists the compute service manager 112 in determining which nodes in the execution platform 114 have already cached at least a portion of the data needed to process the task. One or more nodes in the execution platform 114 process the task using data cached by the nodes and, if necessary, data retrieved from the cloud computing storage platform 104. It is desirable to retrieve as much data as possible from caches within the execution platform 114 because the retrieval speed is typically much faster than retrieving data from the cloud computing storage platform 104.

As shown in FIG. 1, the shared data processing platform 100 separates the execution platform 114 from the cloud computing storage platform 104. In this arrangement, the processing resources and cache resources in the execution platform 114 operate independently of the data storage devices 124-1 to 124-N in the cloud computing storage platform 104. Thus, the computing resources and cache resources are not restricted to specific data storage devices 124-1 to 124-N. Instead, all computing resources and all cache resources may retrieve data from, and store data to, any of the data storage resources in the cloud computing storage platform 104.

Figure 2:
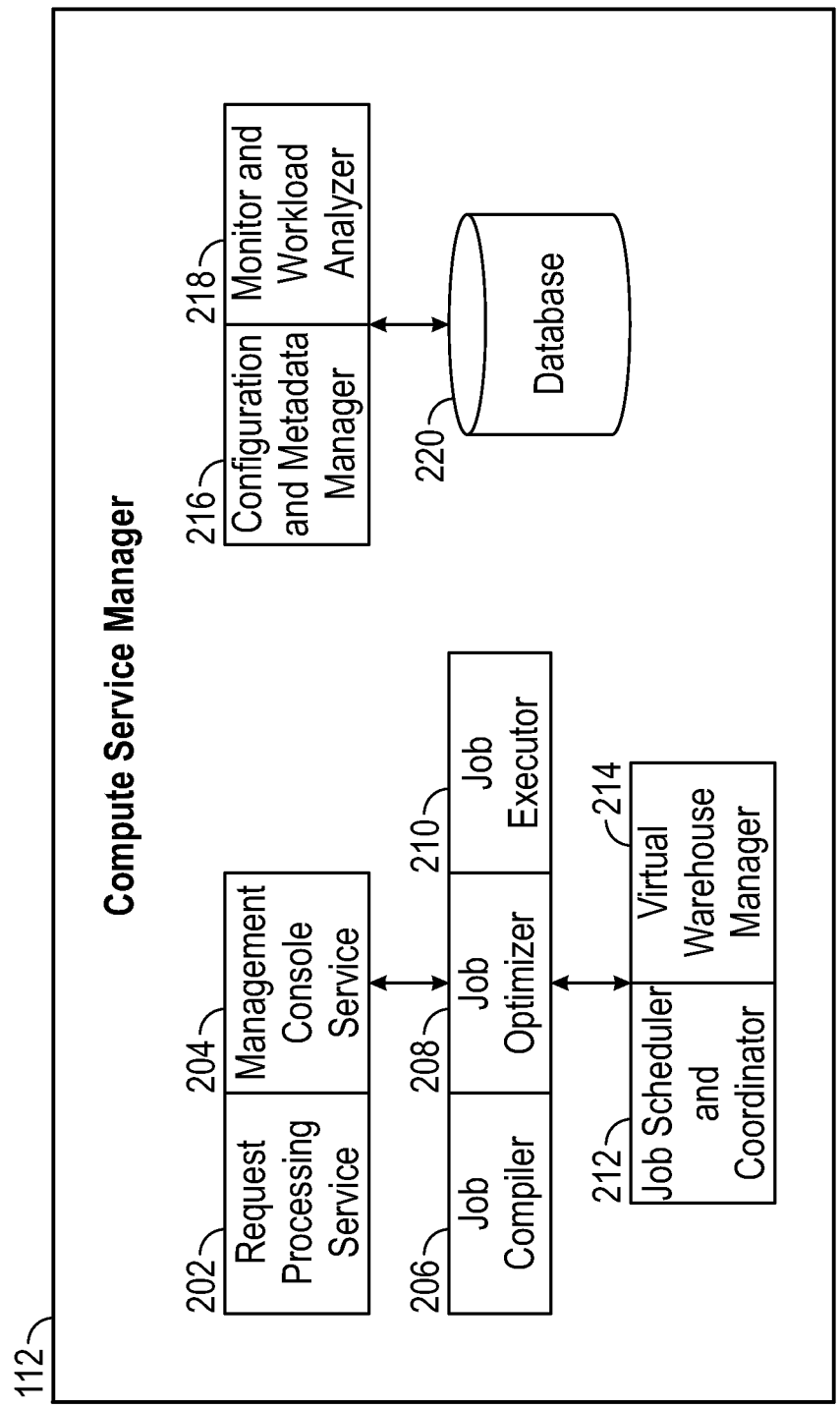
FIG. 2 is a block diagram illustrating components of a compute service manager, according to some example embodiments.

FIG. 2 is a block diagram illustrating components of the compute service manager 112, in accordance with some embodiments of the present disclosure. As shown in FIG. 2, a request processing service 202 manages received data storage requests and data retrieval requests (e.g., jobs to be performed on database data). For example, the request processing service 202 may determine the data necessary to process a received query (e.g., a data storage request or data retrieval request). The data may be stored in a cache within the execution platform 114 or in a data storage device in cloud computing storage platform 104. A management console service 204 supports access to various systems and processes by administrators and other system managers. Additionally, the management console service 204 may receive a request to execute a job and monitor the workload on the system.

The compute service manager 112 also includes a job compiler 206, a job optimizer 208, and a job executor 210. The job compiler 206 parses a job into multiple discrete tasks and generates the execution code for each of the multiple discrete tasks. The job optimizer 208 determines the best method to execute the multiple discrete tasks based on the data that needs to be processed. The job optimizer 208 also handles various data pruning operations and other data optimization techniques to improve the speed and efficiency of executing the job. The job executor 210 executes the execution code for jobs received from a queue or determined by the compute service manager 112.

A job scheduler and coordinator 212 sends received jobs to the appropriate services or systems for compilation, optimization, and dispatch to the execution platform 114. For example, jobs may be prioritized and processed in that prioritized order. In an embodiment, the job scheduler and coordinator 212 determines a priority for internal jobs that are scheduled by the compute service manager 112 with other "outside" jobs such as user queries that may be scheduled by other systems in the database but may utilize the same processing resources in the execution platform 114. In some embodiments, the job scheduler and coordinator 212 identifies or assigns particular nodes in the execution platform 114 to process particular tasks. A virtual warehouse manager 214 manages the operation of multiple virtual warehouses implemented in the execution platform 114. As discussed below, each virtual warehouse includes multiple execution nodes that each include a cache and a processor (e.g., a virtual machine, an operating system level container execution environment).

Additionally, the compute service manager 112 includes a configuration and metadata manager 216, which manages the information related to the data stored in the remote data storage devices and in the local caches (i.e., the caches in execution platform 114). The configuration and metadata manager 216 uses the metadata to determine which data micro-partitions need to be accessed to retrieve data for processing a particular task or job. A monitor and workload analyzer 218 oversees processes performed by the compute service manager 112 and manages the distribution of tasks (e.g., workload) across the virtual warehouses and execution nodes in the execution platform 114. The monitor and workload analyzer 218 also redistributes tasks, as needed, based on changing workloads throughout the network-based database system 102 and may further redistribute tasks based on a user (e.g., "external") query workload that may also be processed by the execution platform 114. The configuration and metadata manager 216 and the monitor and workload analyzer 218 are coupled to a data storage device 220. Data storage device 220 in FIG. 2 represents any data storage device within the network-based database system 102. For example, data storage device 220 may represent caches in execution platform 114, storage devices in cloud computing storage platform 104, or any other storage device.

Figure 3:
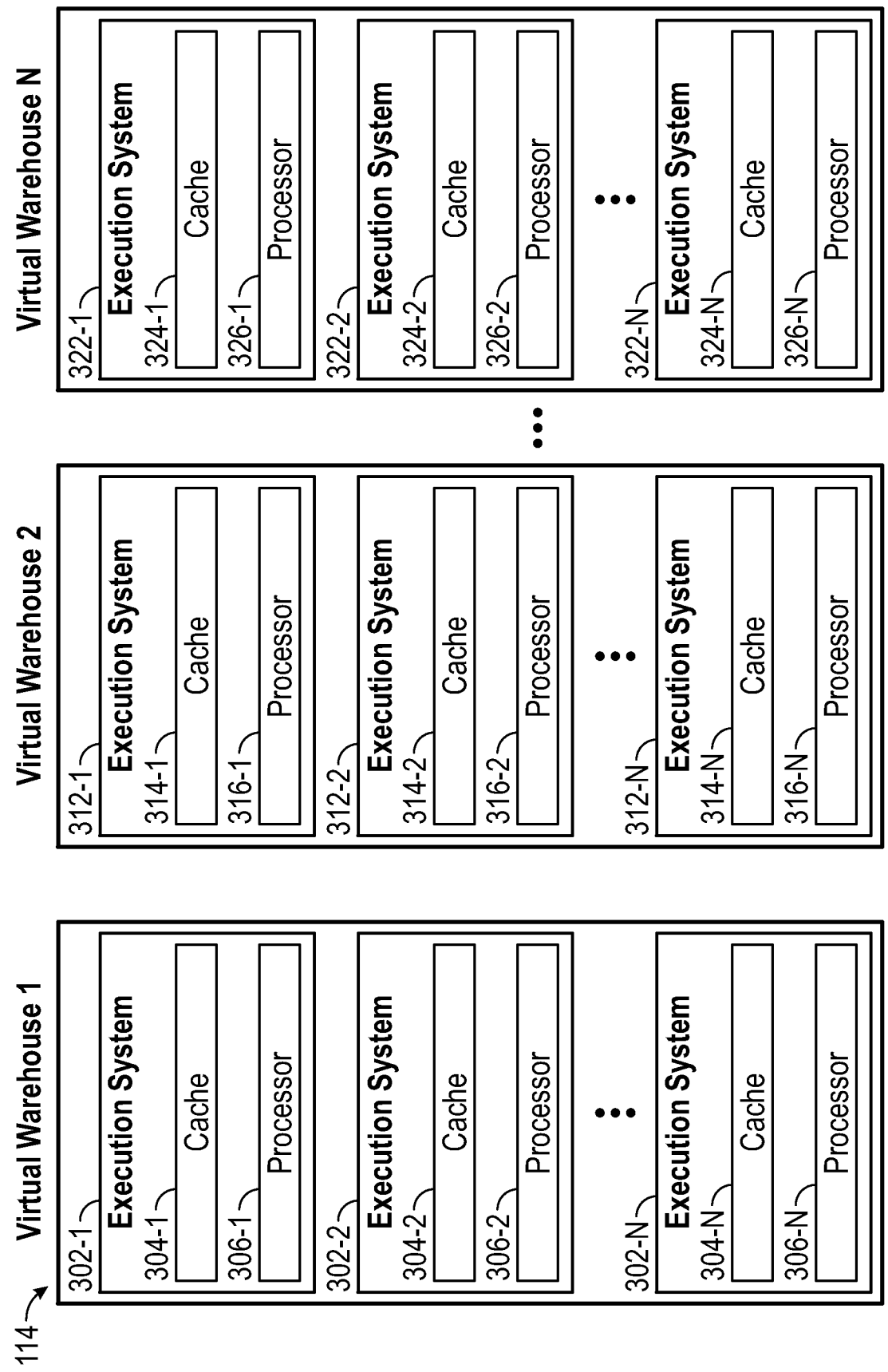
FIG. 3 is a block diagram illustrating components of an execution platform, according to some example embodiments.

FIG. 3 is a block diagram illustrating components of the execution platform 114, in accordance with some embodiments of the present disclosure. As shown in FIG. 3, execution platform 114 includes multiple virtual warehouses, which are elastic clusters of compute instances, such as virtual machines. In the example illustrated, the virtual warehouses include virtual warehouse 1, virtual warehouse 2, and virtual warehouse n. Each virtual warehouse (e.g., EC2 cluster) includes multiple execution nodes (e.g., virtual machines) that each include a data cache and a processor. The virtual warehouses can execute multiple tasks in parallel by using the multiple execution nodes. As discussed herein, execution platform 114 can add new virtual warehouses and drop existing virtual warehouses in real time based on the current processing needs of the systems and users. This flexibility allows the execution platform 114 to quickly deploy large amounts of computing resources when needed without being forced to continue paying for those computing resources when they are no longer needed. All virtual warehouses can access data from any data storage device (e.g., any storage device in cloud computing storage platform 104).

Although each virtual warehouse shown in FIG. 3 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer necessary (e.g., upon a query or job completion).

Each virtual warehouse is capable of accessing any of the data storage devices 124-1 to 124-N shown in FIG. 1. Thus, the virtual warehouses are not necessarily assigned to a specific data storage device 124-1 to 124-N and, instead, can access data from any of the data storage devices 124-1 to 124-N within the cloud computing storage platform 104. Similarly, each of the execution nodes shown in FIG. 3 can access data from any of the data storage devices 124-1 to 124-N. For instance, the storage device 124-1 of a first user (e.g., provider account user) may be shared with a worker node in a virtual warehouse of another user (e.g., consumer account user), such that the other user can create a database (e.g., read-only database) and use the data in storage device 124-1 directly without needing to copy the data (e.g., copy it to a new disk managed by the consumer account user). In some embodiments, a particular virtual warehouse or a particular execution node may be temporarily assigned to a specific data storage device, but the virtual warehouse or execution node may later access data from any other data storage device.

In the example of FIG. 3, virtual warehouse 1 includes three execution nodes 302-1, 302-2, and 302-N. Execution node 302-1 includes a cache 304-1 and a processor 306-1. Execution node 302-2 includes a cache 304-2 and a processor 306-2. Execution node 302-N includes a cache 304-N and a processor 306-N. Each execution node 302-1, 302-2, and 302-N is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual warehouse 1 discussed above, virtual warehouse 2 includes three execution nodes 312-1, 312-2, and 312-N. Execution node 312-1 includes a cache 314-1 and a processor 316-1. Execution node 312-2 includes a cache 314-2 and a processor 316-2. Execution node 312-N includes a cache 314-N and a processor 316-N. Additionally, virtual warehouse 3 includes three execution nodes 322-1, 322-2, and 322-N. Execution node 322-1 includes a cache 324-1 and a processor 326-1. Execution node 322-2 includes a cache 324-2 and a processor 326-2. Execution node 322-N includes a cache 324-N and a processor 326-N.

In some embodiments, the execution nodes shown in FIG. 3 are stateless with respect to the data the execution nodes are caching. For example, these execution nodes do not store or otherwise maintain state information about the execution node, or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although the execution nodes shown in FIG. 3 each include one data cache and one processor, alternative embodiments may include execution nodes containing any number of processors and any number of caches. Additionally, the caches may vary in size among the different execution nodes. The caches shown in FIG. 3 store, in the local execution node (e.g., local disk), data that was retrieved from one or more data storage devices in cloud computing storage platform 104 (e.g., S3 objects recently accessed by the given node). In some example embodiments, the cache stores file headers and individual columns of files as a query downloads only columns necessary for that query.

To improve cache hits and avoid overlapping redundant data stored in the node caches, the job optimizer 208 assigns input file sets to the nodes using a consistent hashing scheme to hash over table file names of the data accessed (e.g., data in database 116 or database 122). Subsequent or concurrent queries accessing the same table file will therefore be performed on the same node, according to some example embodiments.

As discussed, the nodes and virtual warehouses may change dynamically in response to environmental conditions (e.g., disaster scenarios), hardware/software issues (e.g., malfunctions), or administrative changes (e.g., changing from a large cluster to smaller cluster to lower costs). In some example embodiments, when the set of nodes changes, no data is reshuffled immediately. Instead, the least recently used replacement policy is implemented to eventually replace the lost cache contents over multiple jobs. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes, which is significantly faster and avoids the bottleneck problem discussed above. In some embodiments, the caches are implemented using high-speed memory devices that provide fast access to the cached data. Each cache can store data from any of the storage devices in the cloud computing storage platform 104.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet another execution node may contain cache resources providing faster input-output operations, useful for tasks that require fast scanning of large amounts of data. In some embodiments, the execution platform 114 implements skew handling to distribute work amongst the cache resources and computing resources associated with a particular execution, where the distribution may be further based on the expected tasks to be performed by the execution nodes. For example, an execution node may be assigned more processing resources if the tasks performed by the execution node become more processor-intensive. Similarly, an execution node may be assigned more cache resources if the tasks performed by the execution node require a larger cache capacity. Further, some nodes may be executing much slower than others due to various issues (e.g., virtualization issues, network overhead). In some example embodiments, the imbalances are addressed at the scan level using a file stealing scheme. In particular, whenever a node process completes scanning its set of input files, it requests additional files from other nodes. If the one of the other nodes receives such a request, the node analyzes its own set (e.g., how many files are left in the input file set when the request is received), and then transfers ownership of one or more of the remaining files for the duration of the current job (e.g., query). The requesting node (e.g., the file stealing node) then receives the data (e.g., header data) and downloads the files from the cloud computing storage platform 104 (e.g., from data storage device 124-1), and does not download the files from the transferring node. In this way, lagging nodes can transfer files via file stealing in a way that does not worsen the load on the lagging nodes.

Although virtual warehouses 1, 2, and n are associated with the same execution platform 114, the virtual warehouses may be implemented using multiple computing systems at multiple geographic locations. For example, virtual warehouse 1 can be implemented by a computing system at a first geographic location, while virtual warehouses 2 and n are implemented by another computing system at a second geographic location. In some embodiments, these different computing systems are cloud-based computing systems maintained by one or more different entities.

Additionally, each virtual warehouse is shown in FIG. 3 as having multiple execution nodes. The multiple execution nodes associated with each virtual warehouse may be implemented using multiple computing systems at multiple geographic locations. For example, an instance of virtual warehouse 1 implements execution nodes 302-1 and 302-2 on one computing platform at a geographic location and implements execution node 302-N at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

Execution platform 114 is also fault tolerant. For example, if one virtual warehouse fails, that virtual warehouse is quickly replaced with a different virtual warehouse at a different geographic location.

A particular execution platform 114 may include any number of virtual warehouses. Additionally, the number of virtual warehouses in a particular execution platform is dynamic, such that new virtual warehouses are created when additional processing and/or caching resources are needed. Similarly, existing virtual warehouses may be deleted when the resources associated with the virtual warehouse are no longer necessary.

In some embodiments, the virtual warehouses may operate on the same data in cloud computing storage platform 104, but each virtual warehouse has its own execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance observed by the existing users.

As mentioned above, computing instances (e.g., compute service managers, execution platforms) may employ caches for data stored in databases, such as a metadata database. Next, techniques for active invalidation of cache entries are described. The source database, such as the metadata database, can keep a log of updates to data entities and their versions. Data entities may be data objects that can be cached. The log can be sorted by logical timestamps, as discussed in further detail below.

Two approaches are discussed below: "Active Invalidation V1" and "Active Invalidation V2." As described in further detail below, these approaches may be used separately or in combination. For "Active Invalidation V1", at the start of a query, a compute instance (e.g., compute service manager) reads the log of updates from the end time of the last read of the update log to the newest entry in the log. The compute instance invalidates cache entries for which the version of the update log entry is greater than the version of the cache entry. The query coordinator component and the compiler may then use any entries left in the cache during query compilation without having to further validate it against the database.

For "Active Invalidation V2", a background thread running inside the compute instance periodically (e.g., every few milliseconds) reads the update log in the database and invalidates cache entries for which the version of the update log entry is greater than the version of the cache entry based on entity timestamp information. The query coordinator component and the compiler may then use any entry in the cache during query compilation without further validating it against the database.

Figure 4:
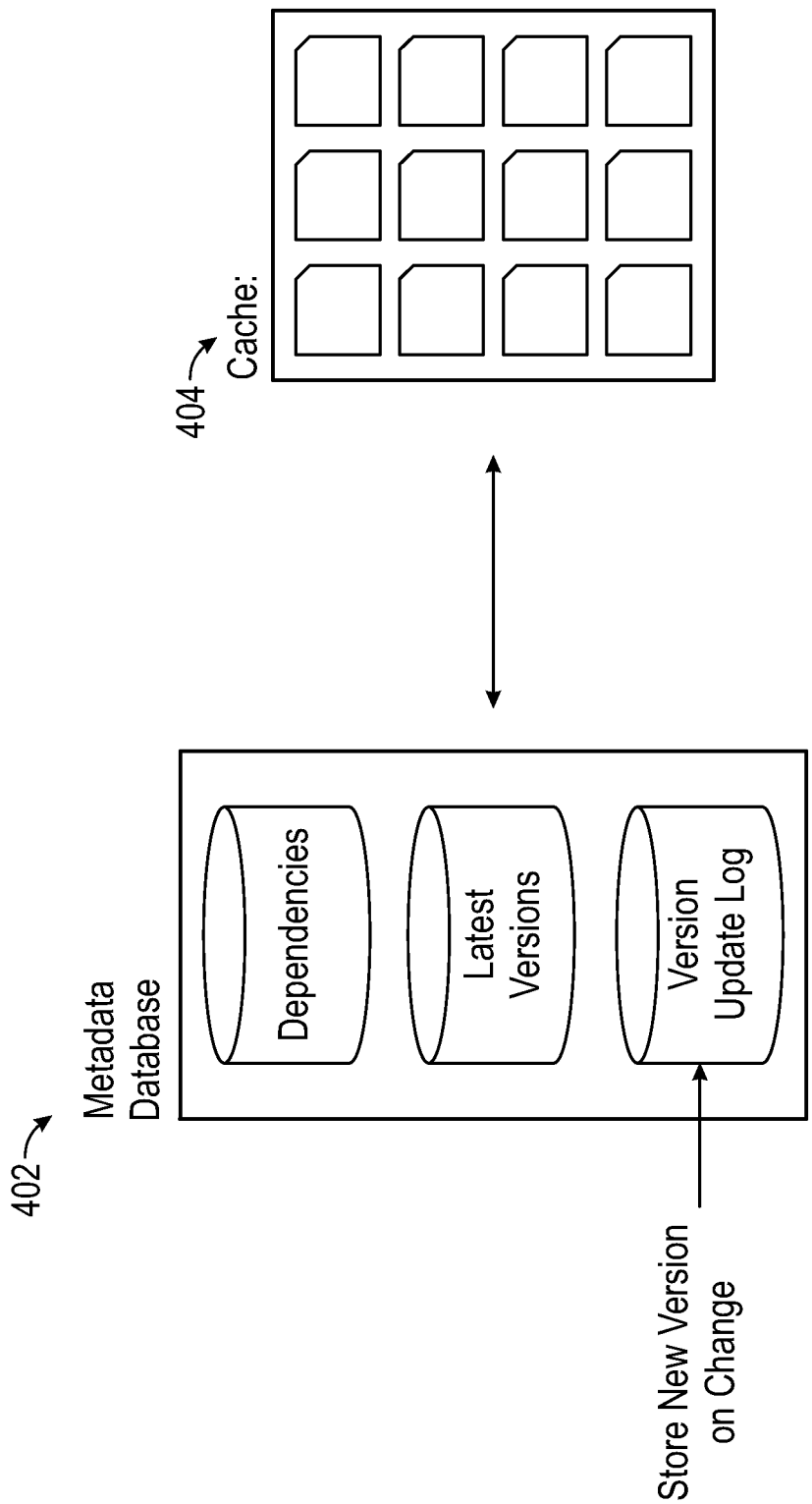
FIG. 4 illustrates a metadata database and cache, according to some example embodiments.

FIG. 4 illustrates a metadata database and cache, according to some example embodiments. A metadata database 402 can store data entities as described herein. The cache 404 may store select data entities from the metadata database 402 for quick retrieval by computing instances. A metadata database 402 can store dependency information (e.g., dependencies) and data regarding latest versions of data entities.

Dependency information can include cached data packages. The data regarding latest versions can include version numbers of the cached data packages.

The metadata database 402 can also include version updates log, which includes a log of new versions on dependency changes. The metadata database 402 keeps a log of updates of data entities and their versions, which is sorted by timestamps. The timestamps may be logical timestamps. That is, the logical timestamps may not represent actual time but may be monotonically increasing numbers. An atomic counter can be used to implement such timestamps.

The log of version updates can include records that contain the entity id of a metadata entity, the version of the entity, and the logical timestamp at which the entity was updated in the database. The log may contain more than one record for the same entity id. In this case, the version numbers can differ between these two records as well as the timestamps. The log of updates can be stored in the database in a separate table, in addition to the actual metadata entities.

Figure 5:
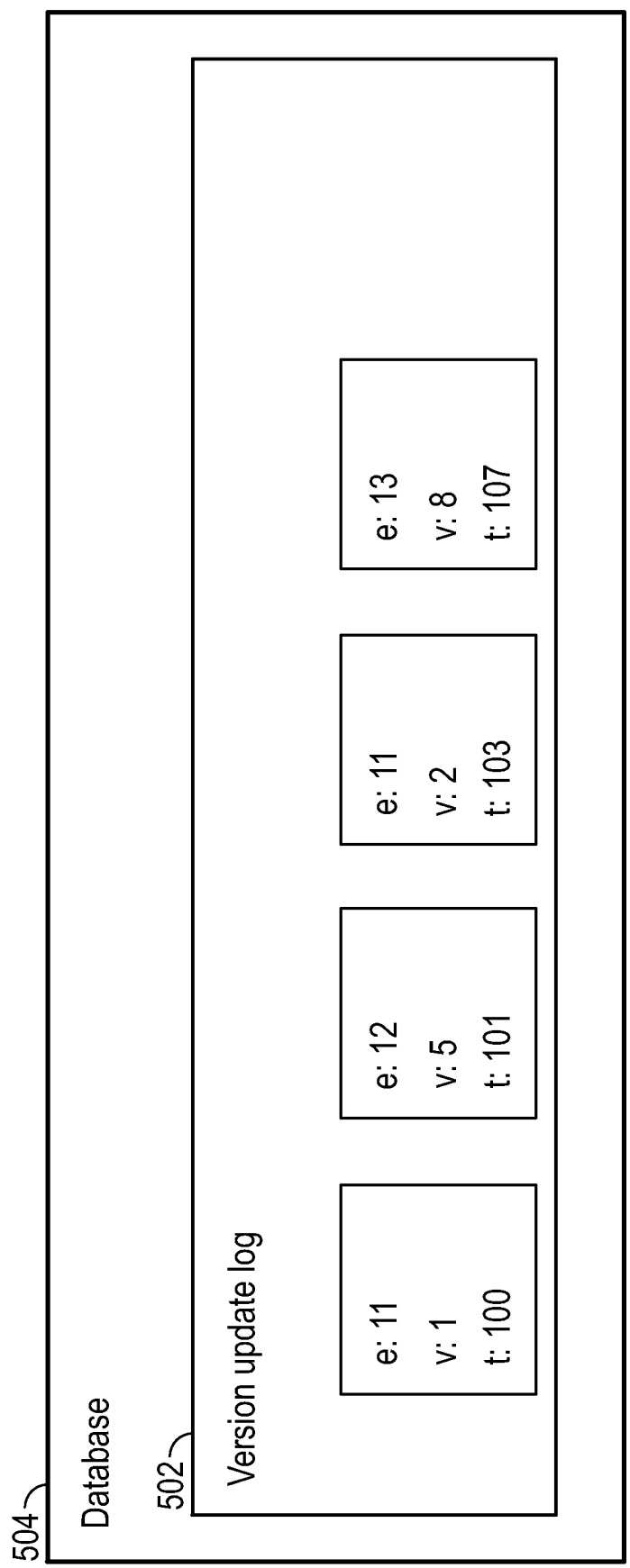
FIG. 5 illustrates an example of a version update log stored in a database, according to some example embodiments.

FIG. 5 illustrates an example of a version update log stored in a database, according to some example embodiments. A version update log 502 can be stored in a database 504. In this example, the version update log 502 log contains four records for three entities with entity IDs 11, 12, and 13 (abbreviated by "e"). There are two records for entity 11. Each record contains a version number ("v") and a timestamp ("t"). The log is sorted by timestamps ("t").

When the system writes a new version of an entity or updates the version of an entity to the database, the system also writes a new record to the version update log. The new record consists of the ID of the entity, the new version number of the entity, and the logical timestamp at which the new version of the entity was written to the database.

Active Invalidation V1

With "Active Invalidation V1", the system invalidates entries in the metadata cache of a compute instance based on records in the version update log at the start of a query. For example, the query coordinator component and the compiler may then use entries from the metadata cache without validation against the database. This avoids lookups in the database when reading from the metadata cache. This approach adds one range lookup/read in the database to read the version update log in the beginning of each query as opposed to the numerous point lookups in the database used in conventional systems; therefore, the techniques described herein significantly reduce latency and speed up end-to-end processing times of queries.

Figure 6:
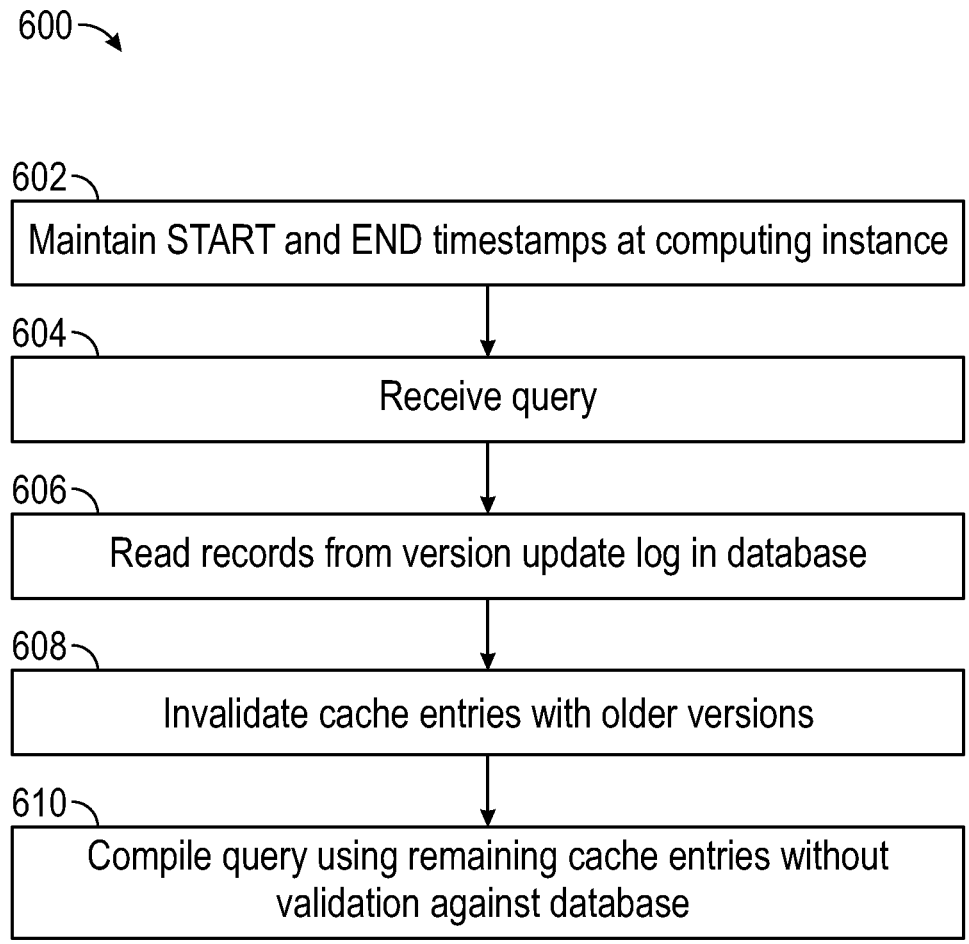
FIG. 6 illustrates a flow diagram of a method for active invalidation of cache entries at the start of a query, according to some example embodiments.

A compute instance invalidates entries in the metadata cache independently. FIG. 6 illustrates a flow diagram of a method 600 for active invalidation of cache entries at the start of a query, according to some example embodiments. At operation 602, a compute instance stores and maintains two logical timestamps START and END. These timestamps mark the point in (logical) time when the compute instance has started to read from the version update log and when the compute instance last stopped reading from the version update log.

The compute instance updates the START timestamp in cases when it has not yet started reading from the version update log or in cases when it has too many records to process that it would overload the database lookup itself. In these cases, the compute instance sets the START timestamp to the smallest timestamp in the list of records it reads at the start of a query.

At operation 604, a query is received and routed to the compute instance. At operation 606, at the start of a query that is routed to the compute instance, the compute instance reads records from the version update log in the database. The compute instance reads records with timestamps that are greater than the END timestamp of the compute instance, which corresponds to the time the compute instance last read from the version update log. The compute instance uses a single range lookup/read in the database to read from the version update log.

Figure 7:
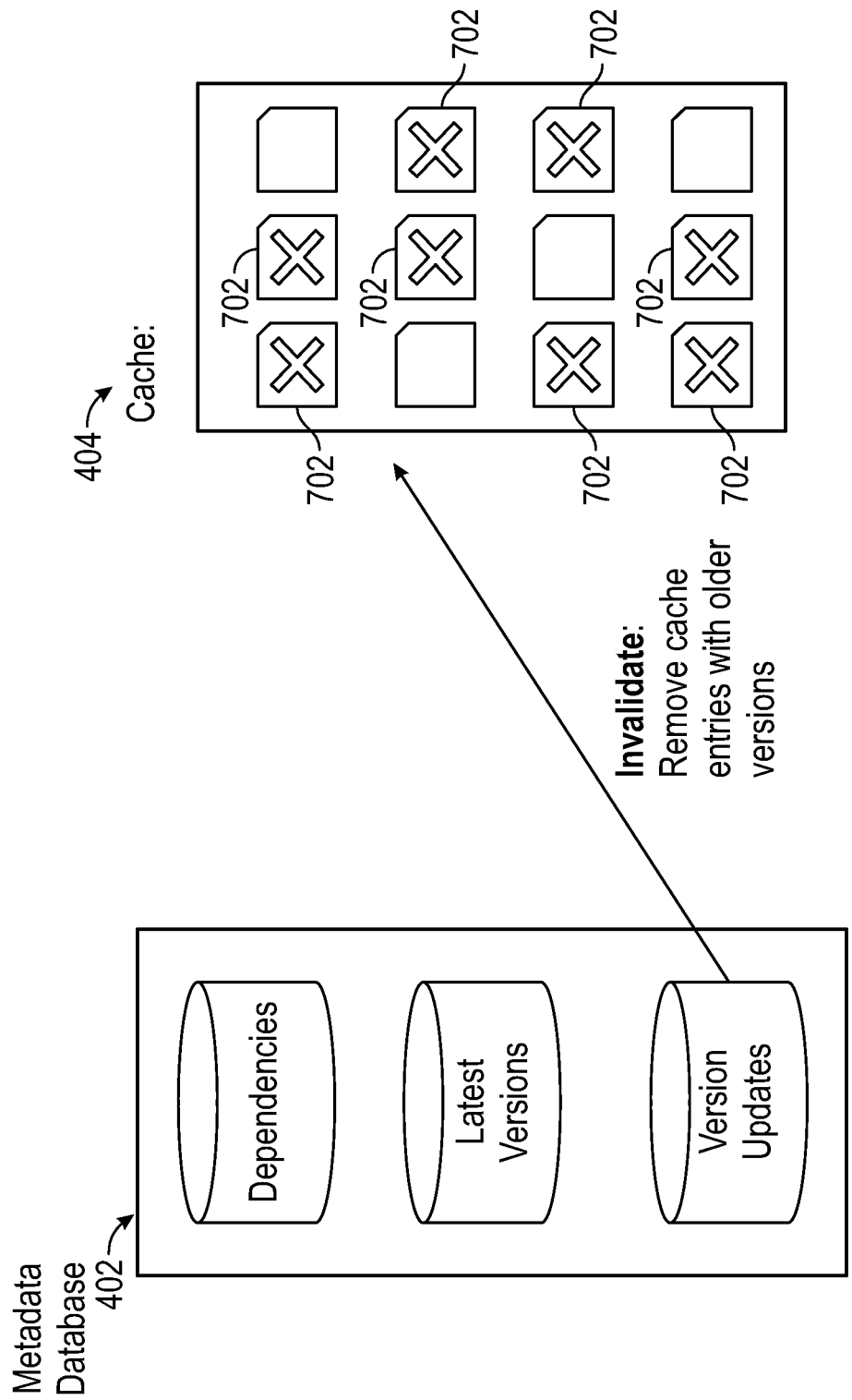
FIG. 7 illustrates a graphical representation of cache invalidation, according to some example embodiments.

At operation 608, the compute instance invalidates cache entries by removing stale cache entries based on reading the version update log. For each record in the version update log, the compute instance invalidates the corresponding entry in the metadata cache if such an entry with the record's entity ID exists in the cache and if the version number in the record is higher than the version number of the entry in the cache. FIG. 7 illustrates a graphical representation of cache invalidation, according to some example embodiments. Cache entries 702 may be identified as stale entries and may be invalidated. The compute instance can update its END timestamp to the highest timestamp that the compute instance has read from the version update log.

Figure 8:
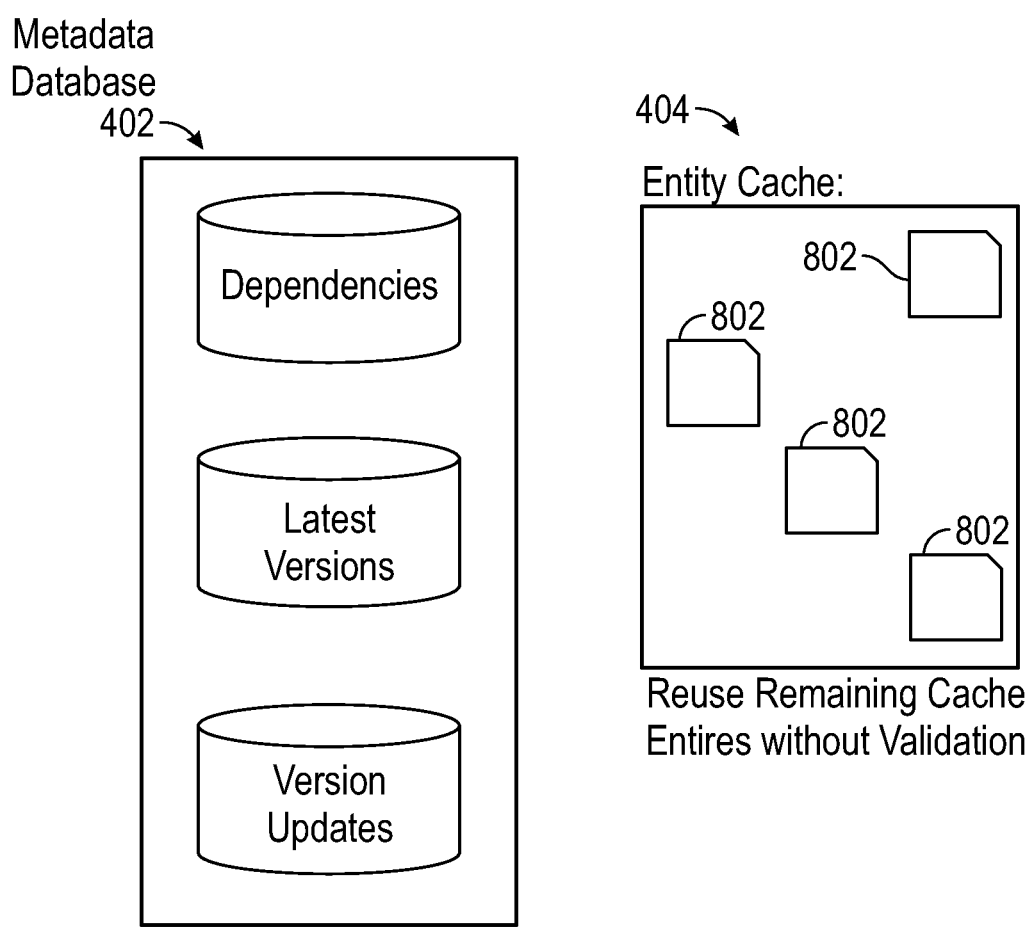
FIG. 8 illustrates a graphical representation of query compilation using remaining cache entries without validation, according to some example embodiments.

At operation 610, the compute instance compiles the query using the remaining cache entries without validation against the database. The compute instance can then execute the compiled query. FIG. 8 illustrates a graphical representation of query compilation using remaining cache entries without validation, according to some example embodiments. Cache entries 802 are the remaining cache entries after stale cache entries 702 are removed from the cache. Thus, the compute instance can use the cache entries 802 without further validation against the database.

The compute instance can confirm that cache entries 802 are valid for query compilation. For example, the compute instance can confirm that the respective cache entry was previously validated. The cache entry may include an entity timestamp corresponding to the logical time the cache entry was last validated. For example, when the query coordinator component or the compiler reads an entity from the cache, the query coordinator or compiler can check if the START timestamp of the compute instance is less than entity's timestamp that determines when the cache entry was last validated (START<entity timestamp), ensuring that the cache entry was previously validated since the compute instance started reading the version update log.

In some examples, the query coordinator or compiler can also confirm that a query start time is at or before the END timestamp to verify relevant version updates have been read. If so, the cache entry can be used without validation against the database. The active invalidation approach saves point lookups in the database, and therefore speeds up query compilation and end-to-end query runtime.

The cache does not return invalidated entries. In the case that a compute instance cannot confirm the validity of a cache entry as described above, the query coordinator or compiler can validate the cache entry against the database before using the cache entry.

Let's consider an example with the version update log shown in FIG. 5: assume the compute instance, at time 105, reads records with timestamps 101 and 103 from the version update log shown in FIG. 5. The compute instance would then set the START timestamp to 101 (because the START timestamp was not set before in this example) and END timestamp to 103. The compute instance can also invalidate entries in the cache with entity IDs 12 and 11 if the respective entities exist in the cache and if their versions are below 5 and 2 respectively. Thereafter, when the query coordinator component or the compiler accesses any entity in the cache that was added to the cache between timestamps 101 and 103 (both inclusive), those components can use these cache entries without validation against the database. At the start of the next query at time 107, the compute instance would read the version update log starting at timestamp 103 (exclusive), which corresponds to its END timestamp, and read the record with ID 13. The compute instance can then update the END timestamp to 107.

If the compute instance reads multiple records from the version update log with the same entity ID (e.g., entity ID 11 in FIG. 5), the compute instance can use the record with the greatest logical timestamp to invalidate entries in the metadata cache. The compute instance can ignore the other records with the same entity ID.

Active Invalidation V2

Active Invalidation V2 approach removes the read access to the version update log from the start of a query that is processed in the foreground. This approach can speed up user-measured end-to-end runtimes. With the Active Invalidation V2 approach, the system can avoid range reading the version update log at the beginning of a query. The system can read the version update log asynchronously in the background as compared to foreground query processing. In this approach, there is a background process in each compute instance that reads records from the version update log periodically. The background component can invalidate entries in the metadata cache and update START and END timestamps in the same way as described in the section above (Active Invalidation V1). The background process can run at a high frequency, for example every 10 milliseconds.

As discussed above, the query coordinator component and the compiler may read entities from the cache and use them without validation against the database. For example, the compute instance can confirm that the respective cache entry was previously validated by checking if the START timestamp of the compute instance is less than entity's timestamp that determines when the cache entry was last validated (START<entity timestamp). The compute instance can also confirm that the start time of the second query is at or before the END timestamp, as described above. In this case, cached entities may be slightly out of date (for example 10 milliseconds), which is acceptable in most cases.

In some use-case scenarios, the system supplements the background update process. For example, when there is a single user of the system that is executing (write) queries at a very high rate, which is higher than the rate of cache invalidations of the background process, the user may not always see their own writes to the system, which can appear as an error to the user. The compute instance may detect these situations with the use of logical timestamps.

Figure 9:
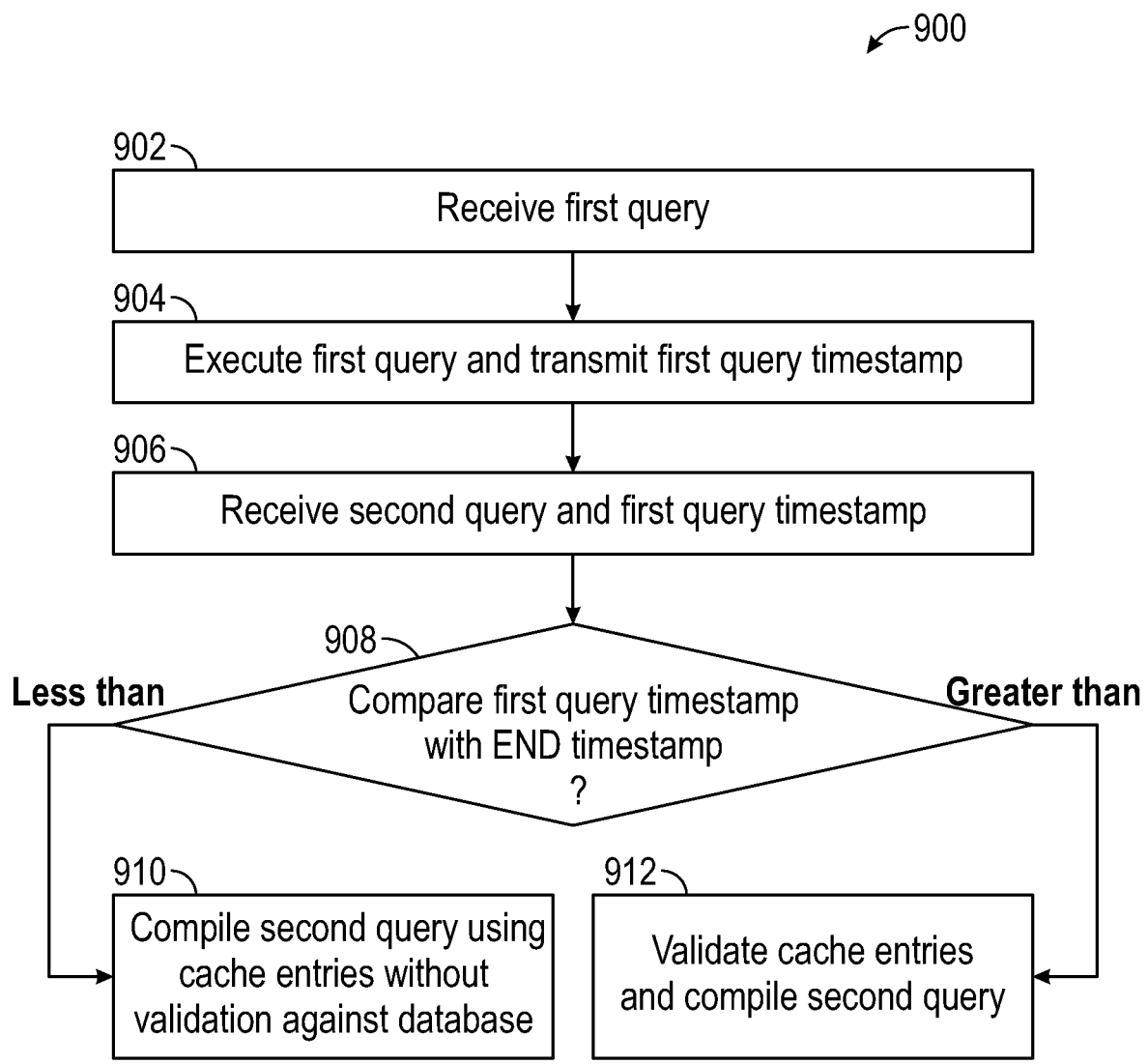
FIG. 9 illustrates a flow diagram of a method for confirming cache entries validated using background invalidation for query processing, according to some example embodiments.

FIG. 9 illustrates a flow diagram of a method 900 for confirming cache entries validated using background invalidation for query processing, according to some example embodiments. At operation 902, a first query from a user is received and routed to a compute instance. For example, the first query may include a write operation. At operation 904, the query is executed by the computing instance and the computing instance transmits a first query timestamp, which corresponds to the latest change in the database that was relevant for the query.

At operation 906, a second query from the user is received and the second query includes the first query timestamp from the first query. For example, the second query may include a read operation relating to data written by the write operation included in the first query. The compute instance that processes the second query may be different from the compute instance that processed the first query. At operation 908, the compute instance handling the second query may compare the first query timestamp received from the user with its END timestamp, which corresponds to the last time version updates were read from the version update log using the background process described above. This comparison ensures that cache invalidation on the compute instance that processes the second query has caught up to a point in time that is after the time at which the user had made updates to the database in the first query.

At operation 910, if the query timestamp is less than the END timestamp, the compute instance can compile the second query using cache entries without validation against the database. As described above, the compute instance can confirm that cache entries are valid for query compilation. For example, the compute instance can confirm that the respective cache entry was previously validated by checking if the START timestamp of the compute instance is less than entity's timestamp that determines when the cache entry was last validated (START<entity timestamp). The compute instance can also confirm that the start time of the second query is at or before the END timestamp, as described above. The compute instance can then execute the compiled query.

At operation 912, if the query timestamp is greater than the END timestamp, then the compute instance reads from the version update log in the foreground and then compiles the second query. The compute instance can then execute the compiled query.

In some examples, the compute instance can validate the cache entries against the database using point look ups. In some examples, when the compute instance detects the query timestamp is greater than the END timestamp, the compute instance may perform active invalidation triggered by receiving the second query. In other words, the compute instance may perform "Active Invalidation V1" in these scenarios of invalidating out of date cache entries based on receiving a query (see method 600 of FIG. 6) so that the second query compilation will not need to perform single point look up validations, as described above.

Semantically, if there are multiple users of the system, they see updates to entities in the database at a small and acceptable delay (e.g., 10 milliseconds) without this supplement process. However, with this supplement process, a single user can see their own updates using the cache even if in quick succession.

Figure 10:
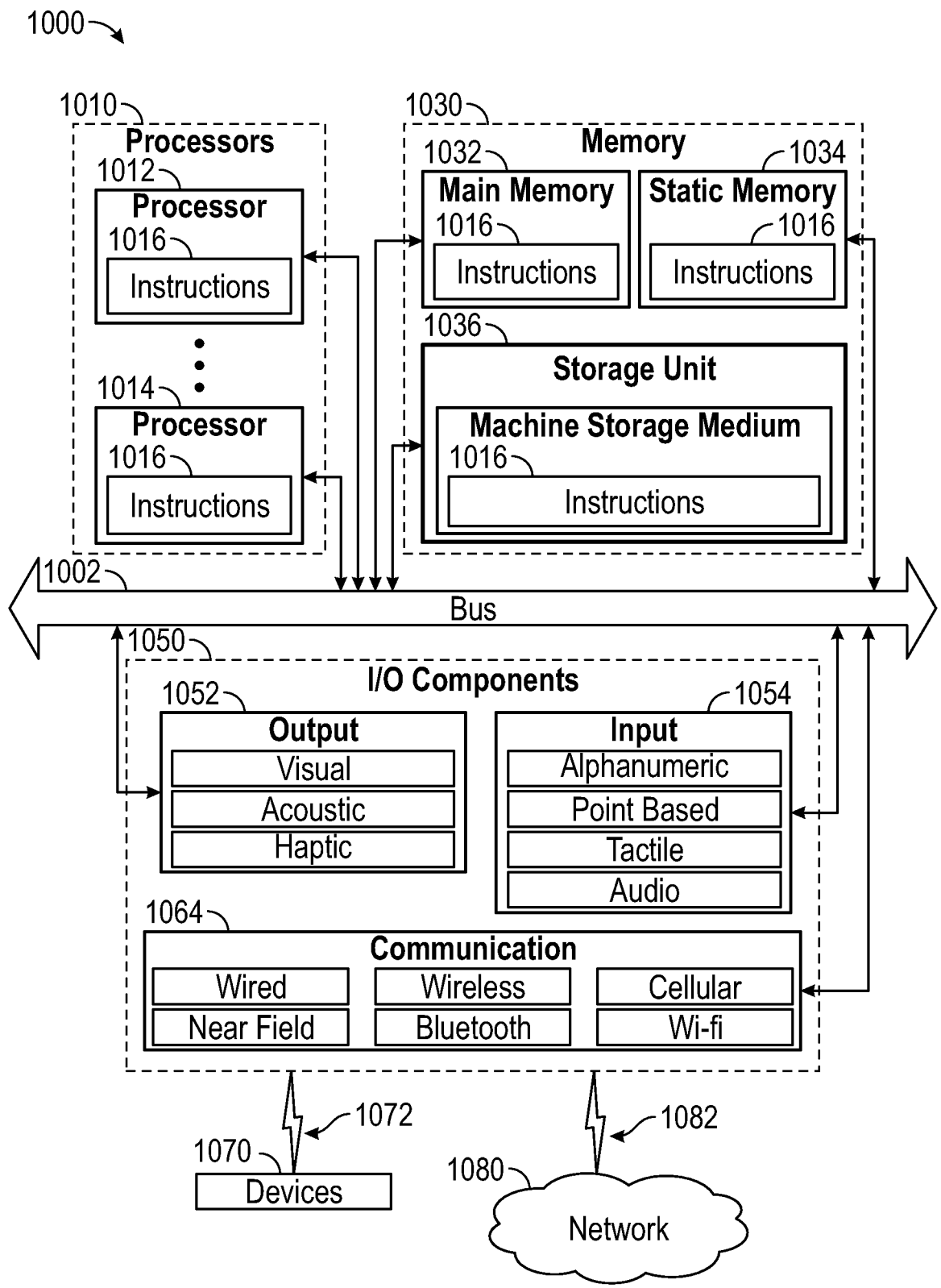
FIG. 10 illustrates a diagrammatic representation of a machine in the form of a computer system within which a set of instructions may be executed for causing the machine to perform any one or more of the methodologies discussed herein, in accordance with some embodiments of the present disclosure.

FIG. 10 illustrates a diagrammatic representation of a machine 1000 in the form of a computer system within which a set of instructions may be executed for causing the machine 1000 to perform any one or more of the methodologies discussed herein, according to an example embodiment. Specifically, FIG. 10 shows a diagrammatic representation of the machine 1000 in the example form of a computer system, within which instructions 1016 (e.g., software, a program, an application, an applet, an app, or other executable code) for causing the machine 1000 to perform any one or more of the methodologies discussed herein may be executed. For example, the instructions 1016 may cause the machine 1000 to execute any one or more operations of any one or more of the methods described herein. As another example, the instructions 1016 may cause the machine 1000 to implement portions of the data flows described herein. In this way, the instructions 1016 transform a general, non-programmed machine into a particular machine 1000 (e.g., the remote computing device 106, the access management system 110, the compute service manager 112, the execution platform 114, the access management system 118, the Web proxy 120) that is specially configured to carry out any one of the described and illustrated functions in the manner described herein.

In alternative embodiments, the machine 1000 operates as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 1016, sequentially or otherwise, that specify actions to be taken by the machine 1000. Further, while only a single machine 1000 is illustrated, the term "machine" shall also be taken to include a collection of machines 1000 that individually or jointly execute the instructions 1016 to perform any one or more of the methodologies discussed herein.

The machine 1000 includes processors 1010, memory 1030, and input/output (I/O) components 1050 configured to communicate with each other such as via a bus 1002. In an example embodiment, the processors 1010 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 1012 and a processor 1014 that may execute the instructions 1016. The term "processor" is intended to include multi-core processors 1010 that may comprise two or more independent processors (sometimes referred to as "cores") that may execute instructions 1016 contemporaneously. Although FIG. 10 shows multiple processors 1010, the machine 1000 may include a single processor with a single core, a single processor with multiple cores (e.g., a multi-core processor), multiple processors with a single core, multiple processors with multiple cores, or any combination thereof.

The memory 1030 may include a main memory 1032, a static memory 1034, and a storage unit 1036, all accessible to the processors 1010 such as via the bus 1002. The main memory 1032, the static memory 1034, and the storage unit 1036 store the instructions 1016 embodying any one or more of the methodologies or functions described herein. The instructions 1016 may also reside, completely or partially, within the main memory 1032, within the static memory 1034, within the storage unit 1036, within at least one of the processors 1010 (e.g., within the processor's cache memory), or any suitable combination thereof, during execution thereof by the machine 1000.

The I/O components 1050 include components to receive input, provide output, produce output, transmit information, exchange information, capture measurements, and so on. The specific I/O components 1050 that are included in a particular machine 1000 will depend on the type of machine. For example, portable machines such as mobile phones will likely include a touch input device or other such input mechanisms, while a headless server machine will likely not include such a touch input device. It will be appreciated that the I/O components 1050 may include many other components that are not shown in FIG. 10. The I/O components 1050 are grouped according to functionality merely for simplifying the following discussion and the grouping is in no way limiting. In various example embodiments, the I/O components 1050 may include output components 1052 and input components 1054. The output components 1052 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 1054 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 1050 may include communication components 1064 operable to couple the machine 1000 to a network 1080 or devices 1070 via a coupling 1082 and a coupling 1072, respectively. For example, the communication components 1064 may include a network interface component or another suitable device to interface with the network 1080. In further examples, the communication components 1064 may include wired communication components, wireless communication components, cellular communication components, and other communication components to provide communication via other modalities. The devices 1070 may be another machine or any of a wide variety of peripheral devices (e.g., a peripheral device coupled via a universal serial bus (USB)). For example, as noted above, the machine 1000 may correspond to any one of the remote computing device 106, the access management system 118, the compute service manager 112, the execution platform 114, the Web proxy 120, and the devices 1070 may include any other of these systems and devices.

The various memories (e.g., 1030, 1032, 1034, and/or memory of the processor(s) 1010 and/or the storage unit 1036) may store one or more sets of instructions 1016 and data structures (e.g., software) embodying or utilized by any one or more of the methodologies or functions described herein. These instructions 1016, when executed by the processor(s) 1010, cause various operations to implement the disclosed embodiments.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 1080 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 1080 or a portion of the network 1080 may include a wireless or cellular network, and the coupling 1082 may be a Code Division Multiple Access (CDMA) connection, a Global System for Mobile communications (GSM) connection, or another type of cellular or wireless coupling. In this example, the coupling 1082 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 1016 may be transmitted or received over the network 1080 using a transmission medium via a network interface device (e.g., a network interface component included in the communication components 1064) and utilizing any one of a number of well-known transfer protocols (e.g., hypertext transfer protocol (HTTP)). Similarly, the instructions 1016 may be transmitted or received using a transmission medium via the coupling 1072 (e.g., a peer-to-peer coupling) to the devices 1070. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1016 for execution by the machine 1000, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of the methods described herein may be performed by one or more processors. The performance of certain of the operations may be distributed among the one or more processors, not only residing within a single machine, but also deployed across a number of machines. In some example embodiments, the processor or processors may be located in a single location (e.g., within a home environment, an office environment, or a server farm), while in other embodiments the processors may be distributed across a number of locations.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

Described implementations of the subject matter can include one or more features, alone or in combination as illustrated below by way of example.

Example 1. A method comprising: storing a first timestamp and a second timestamp, the first timestamp corresponding to an initial time a computing instance read from a version update log in a database and the second timestamp corresponding to a last time the computing instance read from the version update log in the database; reading, by the computing instance, records from the version update log that are associated with version timestamps greater than the second timestamp; invaliding, by the compute instance, a first set of cache entries with older versions stored in a cache based on reading the records and retaining a second set of cache entries; executing, by the compute instance, a query using the second set of cache entries.

Example 2. The method of example 1, wherein the reading is performed using a single range read.

Example 3. The method of any of examples 1-2, wherein compilation of the query is performed without validating the second set of cache entries against the database.

Example 4. The method of any of examples 1-3, wherein the reading the records from the version update is triggered by receiving the query.

Example 5. The method of any of examples 1-4, wherein the reading is triggered by a background process running periodically.

Example 6. The method of any of examples 1-5, further comprising: confirming validity of a respective cache entry in the second set of cache entries by comparing an entity timestamp to the first timestamp.

Example 7. The method of any of examples 1-6, further comprising: confirming validity of a respective cache entry in the second set of cache entries by comparing a start time for the query to the second timestamp.

Example 8. A system comprising: one or more processors of a machine; and a memory storing instructions that, when executed by the one or more processors, cause the machine to perform operations implementing any one of example methods 1 to 7.

Example 9. A machine-readable storage device embodying instructions that, when executed by a machine, cause the machine to perform operations implementing any one of example methods 1 to 7.

What is claimed is:

1. A method comprising:
   storing, at a computing instance in a network-based data system, a first timestamp and a second timestamp, the first timestamp corresponding to an initial time the computing instance read from a version update log in a metadata database provided in the network-based data system and the second timestamp corresponding to a last time the computing instance read from the version update log in the metadata database, the version update log comprising a plurality of records, each record of the plurality of records comprising an entity identification of a respective metadata entity, a version of the metadata entity, and a logical timestamp at which the metadata entity was updated in the metadata database, the first timestamp and second timestamp being logical timestamps;
   reading, by the computing instance, records from the version update log that are associated with version timestamps greater than the second timestamp in a single range read;
   invaliding, by the computing instance, a first set of cache entries with older versions stored in a cache in the computing instance based on reading the records;
   retaining, by the computing instance a second set of cache entries in the cache;
   compiling, by the computing instance, a query without validating the second set of cache entries against the metadata database;
   confirming validity of a respective cache entry in the second set of cache entries by comparing a start time for the query to the second timestamp; and
   executing, by the computing instance, the query using the second set of cache entries.

2. The method of claim 1, wherein the reading the records from the version update is triggered by receiving the query.

3. The method of claim 1, wherein the reading is triggered by a background process running periodically.

4. The method of claim 1, further comprising:
   confirming validity of another respective cache entry in the second set of cache entries by comparing an entity timestamp to the first timestamp.

5. A machine-storage medium embodying instructions that, when executed by a machine, cause the machine to perform operations comprising:
   storing, at a computing instance in a network-based data system, a first timestamp and a second timestamp, the first timestamp corresponding to an initial time the computing instance read from a version update log in a metadata database provided in the network-based data system and the second timestamp corresponding to a last time the computing instance read from the version update log in the metadata database, the version update log comprising a plurality of records, each record of the plurality of records comprising an entity identification of a respective metadata entity, a version of the metadata entity, and a logical timestamp at which the metadata entity was updated in the metadata database, the first timestamp and second timestamp being logical timestamps;
   reading, by the computing instance, records from the version update log that are associated with version timestamps greater than the second timestamp in a single range read;
   invaliding, by the computing instance, a first set of cache entries with older versions stored in a cache in the computing instance based on reading the records;
   retaining, by the computing instance a second set of cache entries in the cache;
   compiling, by the computing instance, a query without validating the second set of cache entries against the metadata database;
   confirming validity of a respective cache entry in the second set of cache entries by comparing a start time for the query to the second timestamp; and
   executing, by the computing instance, the query using the second set of cache ent.

6. The machine-storage medium of claim 5, wherein the reading the records from the version update is triggered by receiving the query.

7. The machine-storage medium of claim 5, wherein the reading is triggered by a background process running periodically.

8. The machine-storage medium of claim 5, further comprising:
   confirming validity of another respective cache entry in the second set of cache entries by comparing an entity timestamp to the first timestamp.

9. A system comprising:
   at least one hardware processor; and
   at least one memory storing instructions that, when executed by the at least one hardware processor, cause the at least one hardware processor to perform operations comprising:
   storing, at a computing instance in a network-based data system, a first timestamp and a second timestamp, the first timestamp corresponding to an initial time the computing instance read from a version update log in a metadata database provided in the network-based data system and the second timestamp corresponding to a last time the computing instance read from the version update log in the metadata database, the version update log comprising a plurality of records, each record of the plurality of records comprising an entity identification of a respective metadata entity, a version of the metadata entity, and a logical timestamp at which the metadata entity was updated in the metadata database, the first timestamp and second timestamp being logical timestamps;

reading, by the computing instance, records from the version update log that are associated with version timestamps greater than the second timestamp in a single range read;

invaliding, by the computing instance, a first set of cache entries with older versions stored in a cache in the computing instance based on reading the records;

retaining, by the computing instance a second set of cache entries in the cache;

compiling, by the computing instance, a query without validating the second set of cache entries against the metadata database;

confirming validity of a respective cache entry in the second set of cache entries by comparing a start time for the query to the second timestamp; and executing, by the computing instance, the query using the second set of cache ent.

10. The system of claim 9, wherein the reading the records from the version update is triggered by receiving the query.

11. The system of claim 9, wherein the reading is triggered by a background process running periodically.

12. The system of claim 9, the operations further comprising:

confirming validity of another respective cache entry in the second set of cache entries by comparing an entity timestamp to the first timestamp.

\* \* \* \* \*

UNITED STATES PATENT AND TRADEMARK OFFICE
CERTIFICATE OF CORRECTION

PATENT NO. : 12,210,527 B2
APPLICATION NO. : 18/128152
DATED : January 28, 2025
INVENTOR(S) : Dageville et al.

Page 1 of 1

It is certified that error appears in the above-identified patent and that said Letters Patent is hereby corrected as shown below:

In the Claims

In Column 20, Line 48, in Claim 5, delete "ent." and insert --entries.-- therefor In Column 22, Line 10, in Claim 9, delete "ent." and insert --entries.-- therefor Signed and Sealed this
Tenth Day of June, 2025

Coke Morgan Stewart
*Acting Director of the United States Patent and Trademark Office*